United States Patent
Seo et al.

(10) Patent No.: US 9,042,357 B2
(45) Date of Patent: May 26, 2015

(54) METHOD AND APPARATUS FOR TRANSMITTING UPLINK CONTROL INFORMATION IN A WIRELESS COMMUNICATION SYSTEM

(75) Inventors: Dong Youn Seo, Anyang-si (KR); Min Gyu Kim, Anyang-si (KR); Suck Chel Yang, Anyang-si (KR); Joon Kui Ahn, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 67 days.

(21) Appl. No.: 13/812,361

(22) PCT Filed: Jul. 26, 2011

(86) PCT No.: PCT/KR2011/005489
§ 371 (c)(1),
(2), (4) Date: Jan. 25, 2013

(87) PCT Pub. No.: WO2012/015212
PCT Pub. Date: Feb. 2, 2012

(65) Prior Publication Data
US 2013/0322355 A1 Dec. 5, 2013

Related U.S. Application Data

(60) Provisional application No. 61/367,854, filed on Jul. 26, 2010.

(51) Int. Cl.
*H04J 3/00* (2006.01)
*H04J 11/00* (2006.01)
(Continued)

(52) U.S. Cl.
CPC ......... *H04W 72/0406* (2013.01); *H04L 1/1861* (2013.01); *H04L 5/0053* (2013.01); *H04L 1/0028* (2013.01)

(58) Field of Classification Search
CPC ............ H04W 72/0406; H04W 72/04; H04W 72/042; H04W 76/02

USPC .............. 455/450, 452.1; 370/329, 345, 328, 370/341, 344, 377, 468, 426, 431, 438, 370/439; 714/48, 746, 748, 749

See application file for complete search history.

(56) References Cited

U.S. PATENT DOCUMENTS 8,489,105 B2 * 7/2013 Choi .......................... 455/452.1
2003/0128673 A1 7/2003 Lee et al.
(Continued)

FOREIGN PATENT DOCUMENTS

CN 1431838 A 7/2003
CN 101611652 A 12/2009

OTHER PUBLICATIONS

LG Electronics, "Resource Allocation for ACK/NACK PUCCH", 3GPP TSG RAN WG1 #61bis, R1-103728, Jun. 28-Jul. 2, 2010, Dresden, Germany, 6 pages.
(Continued)

*Primary Examiner* — Hanh N Nguyen
(74) *Attorney, Agent, or Firm* — Birch, Stewart, Kolasch & Birch, LLP

(57) ABSTRACT

The present invention relates to a method for a terminal, in which a plurality of serving cells is established, to transmit uplink control information in a wireless communication system. The method comprises the following steps: receiving at least one physical downlink control channel (PDCCH) in a first subframe via a first serving cell from among the plurality of serving cells in a first subframe; receiving at least one physical downlink shared channel (PDSCH) via at least one serving cell from among the plurality of serving cells in the first subframe based on said at least on PDCCH; and transmitting, in a second subframe, an acknowledgement/non-acknowledgement (ACK/NACK) which indicates whether or not a decoding for said at least one PDSCH has succeeded. The ACK/NACK is transmitted using a first resource through only the first serving cell, and transmitted using a second resource in the second subframe if said at least one PDSCH is received through two or more serving cells from among the plurality of serving cells. The first resource is dynamically allocated through the PDCCH which schedules the first serving cell, and the second resource is designated in advance.

11 Claims, 11 Drawing Sheets

(51) Int. Cl.
*H04L 1/18* (2006.01)
*H04W 72/04* (2009.01)
*H04L 5/00* (2006.01)
*H04L 1/00* (2006.01)

(56) References Cited

U.S. PATENT DOCUMENTS

| | | |
|---|---|---|
| 2008/0159323 A1 | 7/2008 | Rinne et al. |
| 2011/0194514 A1* | 8/2011 | Lee et al. ............... 370/329 |
| 2012/0002631 A1* | 1/2012 | Nishio et al. ............ 370/329 |
| 2012/0300722 A1* | 11/2012 | Kim et al. ............... 370/329 |
| 2013/0114556 A1* | 5/2013 | Yang et al. .............. 370/329 |

OTHER PUBLICATIONS

Nokia, Nokia Siemens Networks, "UL ACK/NAK Feedback in LTE-A TDD", 3GPP TSG RAN WG1 Meeting #60, R1-101419, Feb. 22-26, 2010, San Francisco, US, 4 pages.

Samsung, "PUCCH HARQ-ACK Resource Mapping for DL CA", 3GPP TSG RAN WG1 #61bis, R1-103637, Jun. 28-Jul. 2, 2010, pp. 1-3, Dresden, Germany.

ZTE, "ACK/NACK Design for LTE-Advanced", 3GPP TSG-RAN WG1 Meeting #60, R1-101398, Feb. 22-26, 2010, pp. 1-7, San Francisco, USA.

* cited by examiner

METHOD AND APPARATUS FOR TRANSMITTING UPLINK CONTROL INFORMATION IN A WIRELESS COMMUNICATION SYSTEM

CROSS REFERENCE TO RELATED APPLICATIONS

This application is the National Phase of PCT/KR2011/005489 filed on Jul. 26, 2011, which claims priority under 35 U.S.C. 119(e) to U.S. Provisional Application No. 61/367,854 filed on Jul. 26, 2010, all of which are hereby expressly incorporated by reference into the present application.

TECHNICAL FIELD

The present invention relates to wireless communication and more particularly, a method and apparatus for transmitting uplink control information of a user equipment in a wireless communication system.

BACKGROUND ART

Various techniques for effective communication and resource utilization methods have been developed to maximize efficiency of limited radio resources for broadband wireless communication systems. One of the systems under consideration as the next generation wireless communication system is multiple carrier system. A multiple carrier system refers to the system which provides broad band services by collecting one or more carriers with smaller bandwidth than the bandwidth aimed by a wireless communication system providing the broadband services.

Although a wireless communication system such as the conventional 3GPP (3rd Generation Partnership Project) LTE (Long Term Evolution) employs carriers having various bandwidth, it is basically a system consisting of one carrier, namely, a single carrier system. Meanwhile, the next generation wireless communication system such as the LTE-A (Advanced) may correspond to a multiple carrier system using aggregation of multiple carriers, namely, carrier aggregation (CA). In a multiple carrier system, the carrier which forms the unit of carrier aggregation is called a component carrier (CC). In the multiple carrier system, a user equipment (UE) may be configured to have a plurality of downlink component carrier (DL CC) and a plurality of uplink component carrier (UL CC). In case for the UE receiving a plurality of transmission blocks through a plurality of DL CCs, the UE provides feedback of ACK/NACK (acknowledgement/negative acknowledgement) indicating whether each transmission block has been successfully received or demodulated. Therefore, the amount of transmitted information of ACK/NACK is increased compared with single carrier systems.

In order to transmit the increased ACK/NACK feedback, a new PUCCH (Physical Uplink Control Channel) format is under development and at the same time, a method of using a plurality of PUCCH resources is being taken into consideration. However, in case channel conditions are not favorable in the uplink, transmission of increased ACK/NACK information may become difficult due to limitations to transmission power.

Since the PUCCH structure specified for the 3GPP LTE system is designed based on two bits of ACK/NACK signal, there is needed a design for a control channel for carrying ACK/NACK signal with increased bit size.

Also, it should be noted that transmission blocks are not necessarily transmitted by a large amount of quantity at all times. Therefore, if the control channel is designed according to a maximum capacity, the resulting control channel might be rather inefficient for transmission of ACK/NACK signals with small bit size.

In this regard, there is a need for an efficient method and apparatus for transmitting uplink control information in a multiple carrier system.

DISCLOSURE

Technical Problem

An objective of the present invention is to provide a method and apparatus for transmitting uplink control information in a multiple carrier system.

Technical Solution

A method for transmitting uplink control information of a user equipment for which a plurality of serving cells are configured in a wireless communication system according to one aspect of the present invention comprises receiving at least one physical downlink control channel (PDCCH) in a first subframe through a first serving cell among the plurality of serving cells; receiving at least one physical downlink shared channel (PDSCH) in the first subframe through at least one serving cell among the plurality of serving cells based on the at least one PDCCH; and transmitting ACK/NACK (acknowledgement/negative acknowledgement) indicating success or failure of decoding of the at least one PDSCH in a second subframe, where the ACK/NACK is transmitted by using first resources within the second subframe when the at least one PDSCH is received only by the first serving cell; the ACK/NACK is transmitted by using second resources within the second subframe when the at least one PDSCH is received by two or more serving cells from among the plurality of serving cells; and the first resources are allocated dynamically by a PDCCH which schedules the first serving cell and the second resources are specified beforehand.

The first serving cell may be a primary cell in which the UE carries out a procedure of establishing an initial connection to a base station or a procedure of re-establishing a connection.

The first serving cell may include a first downlink component carrier and a first uplink component carrier, where the at least one PDCCH may be received through the first downlink component carrier and the ACK/NACK may be transmitted through the first uplink component carrier.

The first resources can be determined based on the resources of a PDCCH which schedules the first downlink component carrier.

The second resources can be indicated by a radio resource control (RRC) message.

A PDCCH which schedules serving cells except for the first serving cell from among the at least one PDCCH may include PDSCH aggregate information indicating the total number of PDSCHs transmitted through a plurality of serving cells.

The PDSCH aggregate information can be transmitted through a transmission power control (TPC) field of a uplink component carrier.

If the number of PDSCH received successfully through the at least one serving cell is the same as the number of PDSCHs indicated by the PDSCH aggregate information, one ACK can be transmitted through the second resources.

If the number of PDSCH received successfully through the at least one serving cell is smaller than the number of PDSCHs indicated by the PDSCH aggregate information, one NACK can be transmitted through the second resources.

ACK/NACK transmitted through the second resources may represent the number of PDSCHs received successfully through the at least one serving cell or the number of PDSCHs not received successfully.

The transmitting ACK/NACK may comprise obtaining the first resources from a PDCCH which schedules a PDSCH received through the first serving cell; generating a modulation symbol by modulating the ACK/NACK; determining a cyclic shift value based on the first resources; generating a cyclic-shifted sequence by applying a cyclic shift to a base sequence by the cyclic shift value; spreading the modulation symbol to the cyclic-shifted sequence; and transmitting the spread sequence.

The plurality of serving cells may operate according to frequency division duplex (FDD) scheme which uses different frequencies in the uplink and downlink.

A user equipment according to another aspect of the present invention comprises an RF (Radio Frequency) unit transmitting or receiving wireless signals; and a processor connected to the RF unit, where the processor receives at least one physical downlink control channel (PDCCH) through a first serving cell among a plurality of serving cells configured at a first subframe, receives at least one physical downlink shared channel (PDSCH) through at least one serving cell among the plurality of serving cells based the at least one PDCCH at the first subframe, and transmits ACK/NACK indicating success or failure of decoding of the at least one PDSCH at a second subframe, the ACK/NACK being transmitted by using first resources within the second subframe when the at least one PDSCH is received only at the first serving cell and being transmitted by using second resources within the second subframe when the at least one PDSCH is received through two or more serving cells among the plurality of serving cells, the first resources being allocated dynamically through a PDCCH which schedules the first serving cell while the second resources being specified beforehand.

Advantageous Effects

ACK/NACK is transmitted by using PUCCH resources configured exclusively according to the number of PDSCHs received by a user equipment. A base station can easily determine whether ACK/NACK is meant for a plurality of PDSCHs based on which PUCCH resources the ACK/NACK has been transmitted from.

DESCRIPTION OF DRAWINGS

The accompany drawings, which are included to provide a further understanding of this document and are incorporated on and constitute a part of this specification illustrate embodiments of this document and together with the description serve to explain the principles of this document.

MODE FOR INVENTION

The technology described below can be used for various multiple access schemes including CDMA (Code Division Multiple Access), FDMA (Frequency Division Multiple Access), TDMA (Time Division Multiple Access), OFDMA (Orthogonal Frequency Division Multiple Access) and SC-FDMA (Single Carrier-Frequency Division Multiple Access). CDMA can be implemented by using such radio technology as UTRA (Universal Terrestrial Radio Access) or CDMA2000. TDMA can be implemented by using such radio technology as GSM (Global System for Mobile communications)/GPRS (General Packet Radio Service)/EDGE (Enhanced Data Rates for GSM Evolution). OFDMA can be realized by using such radio technology as the IEEE 802.11 (Wi-Fi), IEEE 802.16 (WiMAX), IEEE 802.20, and E-UTRA (Evolved UTRA). The IEEE 802.16m is an evolved version from the IEEE 802.16e, providing backward compatibility for the systems compliant with the IEEE 802.16e. UTRA is part of specifications for UMTS (Universal Mobile Telecommunications System). The 3GPP LTE is part of E-UMTS (Evolved UMTS) using E-UTRA, which uses OFDMA radio access for the downlink and SC-FDMA on the uplink. The LTE-A (Advanced) is an evolved version of the LTE. In what follows, for the purpose of convenience, it is assumed that descriptions are given based on the LTE/LTE-A, but the technical principles of the present invention are not limited to the assumption.

A user equipment (UE) may be fixed or mobile and called in different terms such as a mobile station (MS), a mobile terminal (MT), a user terminal (UT), a subscriber station (SS), a wireless device, a personal digital assistant (PDA), a wireless modem, or a handheld device.

A base station (BS) usually refers to a fixed station communicating with a user equipment, which is called in different terms such as an evolved-NodeB (eNB), a base transceiver system (BTS), or an access point.

The downlink denotes communication from a base station to a user equipment while the uplink communication from the user equipment to the base station.

Figure 1:
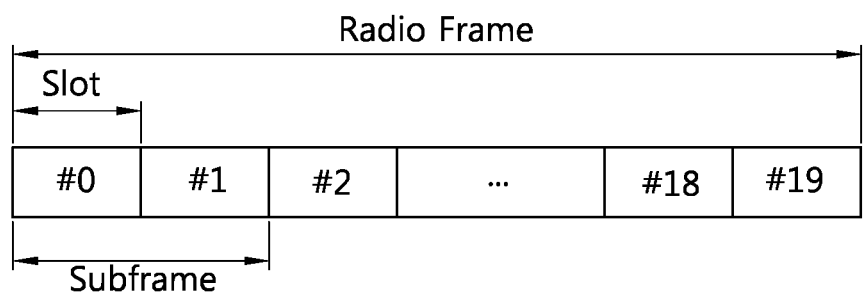
FIG. 1 illustrates structure of a radio frame in the 3GPP LTE.

FIG. 1 illustrates structure of a radio frame in the 3GPP LTE.

The section 4 of the 3GPP TS 36.211 V8.2.0 (2008 March) "Technical Specification Group Radio Access Network; Evolved Universal Terrestrial Radio Access (E-UTRA); Physical channels and modulation (Release 8)" may be incorporated herein by reference.

With reference to FIG. 1, a radio frame consists of 10 subframes and one subframe consists of two slots. Slots within a radio frame are indexed with a slot number ranging from #0 to #19. A time required for transmitting one subframe is defined as a transmission time interval (TTI). TTI may be regarded as a scheduling unit for data transmission. For example, one subframe may have a length of 1 ms and one slot may have a length of 0.5 ms.

One slot includes a plurality of orthogonal frequency division multiplexing (OFDM) symbols in the time domain and a plurality of subcarriers in the frequency domain. Since the 3GPP LTE uses orthogonal frequency division multiple access (OFDMA) in the downlink, the OFDM symbol is introduced only for expressing one symbol period, and may be called in different terms according to multiple access scheme. For example, the OFDM symbol may be called SC-FDMA symbol if SC-FDMA is used as the multiple access scheme. A resource block (RB), a resource allocation unit, includes a plurality of subcarriers in one slot. The radio frame structure is simply an example. Namely, the number of subframes included in a radio frame, the number of slots included in a subframe, or the number of OFDM symbols included in a slot may vary.

Meanwhile, wireless communication systems can be largely classified into frequency division duplex (FDD) scheme and time division duplex (TDD) scheme. In the FDD scheme, the UL and the DL transmission are carried out while occupying different frequency bands from each other. In the TDD scheme, the UL and the DL transmission occupy the same frequency band but are carried out at different times from each other.

Figure 2:
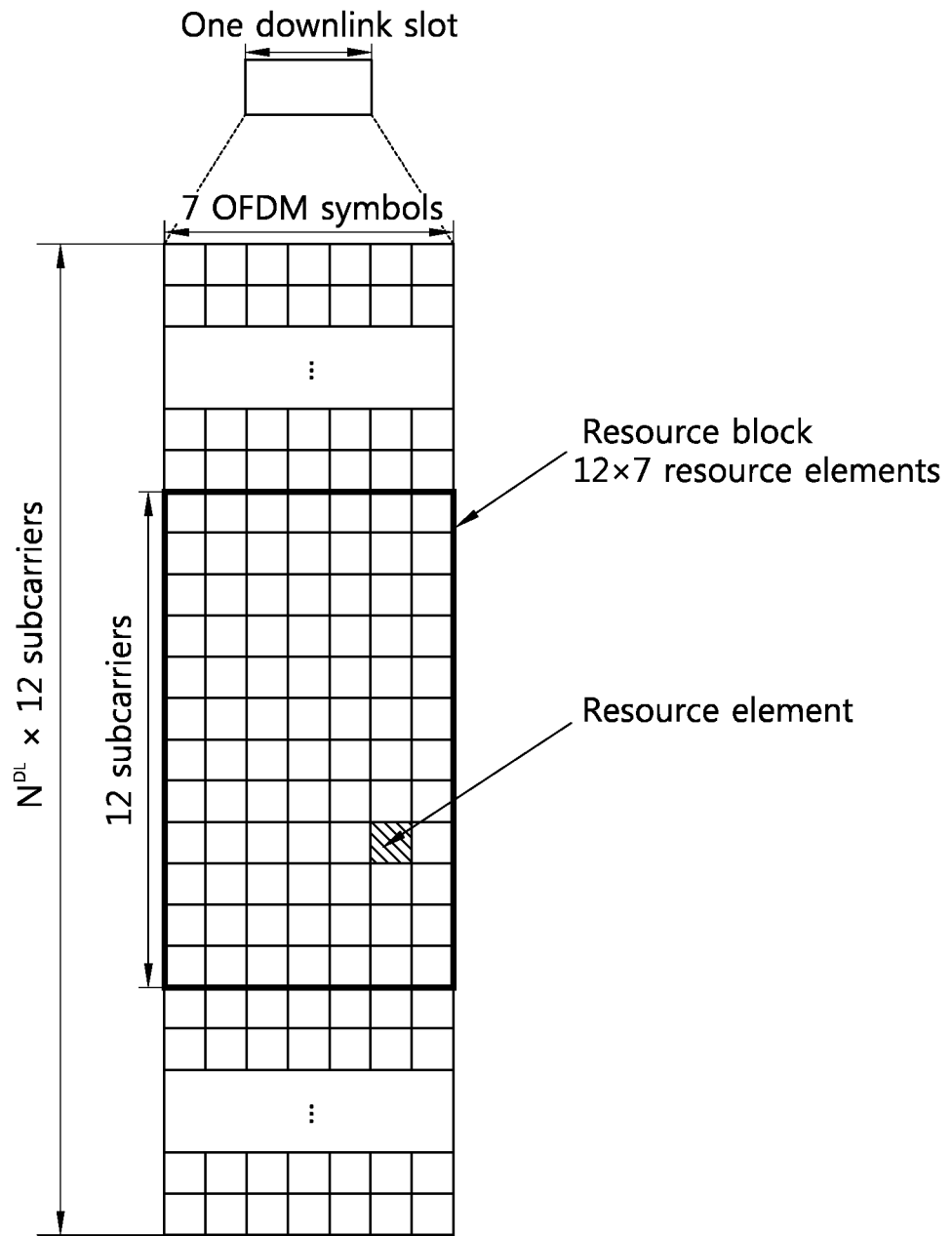
FIG. 2 illustrates one example of a resource grid of a single downlink slot.

FIG. 2 illustrates one example of a resource grid of a single downlink slot.

A DL slot includes a plurality of OFDM symbols in the time domain while $N_{RB}$ resource blocks in the frequency domain. The number of resource blocks $N_{RB}$ included in the DL slot is dependent on the DL transmission bandwidth configured by a cell. For example, $N_{RB}$ in the LTE system may correspond to one of 6 to 110. One resource block includes a plurality of subcarriers in the frequency domain. The structure of a UL slot may be the same as that of the DL slot.

Each element on the resource grid is called a resource element (RE). The resource elements on the resource grid can be discriminated by a pair of indexes (k, l) in the slot. Here, k (k=0, . . . , $N_{RB} \times 12-1$) is a subcarrier index in the frequency domain, and l (l=0, . . . , 6) is an OFDM symbol index in the time domain.

Here, it is illustrated that one resource block includes 7×12 resource elements made up of seven OFDM symbols in the time domain and twelve subcarriers in the frequency domain, but the number of OFDM symbols and the number of subcarriers in the resource block are not limited thereto. The number of OFDM symbols and the number of subcarriers may vary depending on the length of a cyclic prefix (CP), frequency spacing, and the like. For example, in case of a normal CP, the number of OFDM symbols is 7, and in case of an extended CP, the number of OFDM symbols is 6. One of 128, 256, 512, 1024, 1536, and 2048 may be selectively used as the number of subcarriers in one OFDM symbol.

Figure 3:
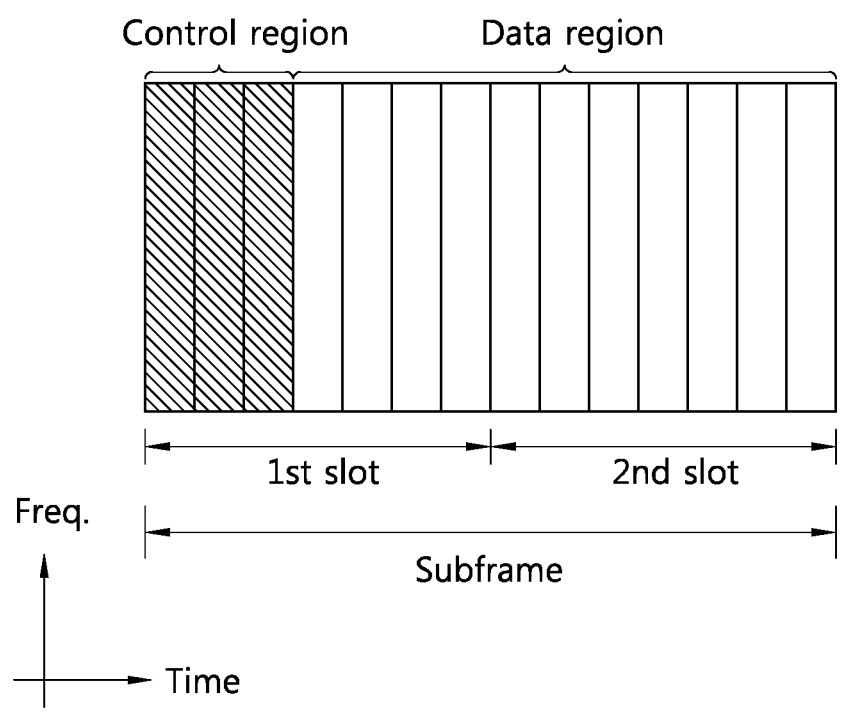
FIG. 3 is the structure of a downlink subframe.

FIG. 3 is the structure of a downlink subframe.

A downlink subframe includes two slots in the time domain, and each of the slots includes seven OFDM symbols in the normal CP. First three OFDM symbols (maximum four OFDM symbols with respect to a 1.4 MHz bandwidth) of a first slot in the subframe corresponds to a control region to which control channels are allocated, and the other remaining OFDM symbols correspond to a data region to which a physical downlink shared channel (PDSCH) is allocated.

As disclosed in the 3GPP TS 36.211 V8.7.0, the control channel in the LTE system comprises PDCCH (Physical Downlink Control Channel), PCFICH (Physical Control Format Indicator Channel), PHICH (Physical Hybrid-ARQ Indicator Channel).

The PCFICH carried by the first OFDM symbol of a subframe carries control format indicator (CFI) which indicates the number of OFDM symbols (namely, size of the control region) used for carrying control channels within a subframe. The UE first receives the CFI through the PCFICH and monitors the PDCCH. Different from the PDCCH, the PCFICH does not use blind decoding but transmitted through the fixed PCFICH resources of a subframe.

The PHICH carries ACK (positive acknowledgement)/NACK (negative acknowledgement) signal for UL hybrid automatic repeat request (HARQ). The ACK/NACK signal about the UL data on the PUSCH transmitted by the UE is transmitted through the PHICH.

A Physical Broadcast Channel (PBCH) is carried by four preceding OFDM symbols of a second slot of a first subframe of the radio frame. The PBCH carries system information essential for the UE to communicate with the BS, where the system information carried through the PBCH is called master information block (MIB). Meanwhile, the system information carried through the PDSCH specified by the PDCCH is called system information block (SIB).

Control information transmitted through PDCCH is called downlink control information (DCI). DCI may include resource allocation of PDSCH (which is also called DL grant), resource allocation of PUSCH (which is called uplink grant), and activation of a set of transmission power control commands for individual UEs within a UE group and/or VoIP (Voice over Internet Protocol).

The 3GPP LTE uses blind decoding for detection of the PDCCH. The blind decoding de-masks an identifier of interest to the CRC of the PDCCH received (which is called a candidate PDCCH) and checks CRC error to confirm whether the corresponding PDCCH is the control channel meant for the blind decoding or not.

Figure 4:
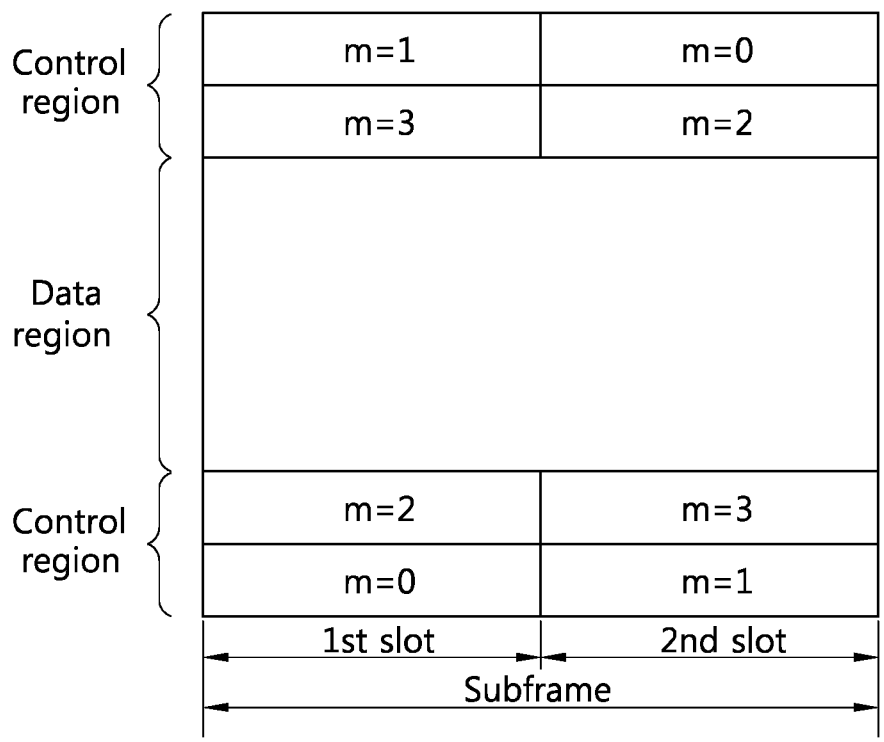
FIG. 4 is the structure of a uplink subframe.

FIG. 4 is the structure of an uplink subframe.

A UL subframe can be divided into a control and data region in the frequency domain. A PUCCH (Physical Uplink Control Channel) carrying uplink control information may be allocated to the control region. A PUSCH (Physical Uplink Shared Channel) carrying user data and/or uplink control information is allocated to the data region. The LTE system does not allow simultaneous transmission of the PUCCH and the PUSCH, whereas the LTE-A can support simultaneous transmission of the PUSCH and PUCCH once the transmission is commanded from a higher layer.

The PUCCH is allocated in the form of an RB pair in a subframe. RBs belonging to an RB pair occupy different subcarriers in a first and a second slot, respectively. m corresponds to a position index representing the logical position in the frequency domain of an RB pair allocated for the PUCCH in a subframe. It can be noticed that RBs having the same m value occupy subcarriers different from each other in the two slots.

According to the 3GPP TS 36.211 V8.7.0, the PUCCH supports multiple formats. According to the modulation scheme dependent on a PUCCH format, a PUCCH with a different number of bits per subframe may be employed.

TABLE 1

| PUCCH format | Modulation scheme | Number of bits per subframe, $M_{bit}$ |
|---|---|---|
| 1 | N/A | N/A |
| 1a | BPSK | 1 |
| 1b | QPSK | 2 |
| 2 | QPSK | 20 |
| 2a | QPSK + BPSK | 21 |
| 2b | QPSK + QPSK | 22 |

The PUCCH format 1 is used for transmission of a scheduling request (SR); the PUCCH format 1a/1b for transmission of ACK/NACK signal for HARQ; the PUCCH format 2 for transmission of CQI; and the PUCCH format 2a/2b for simultaneous transmission of CQI and ACK/NACK signal. When a subframe transmits only the ACK/NACK signal, the PUCCH format 1a/1b is used, whereas the PUCCH format 1 is used when the SR alone is transmitted. When the SR and the ACK/NACK are transmitted at the same time, the PUCCH format 1 is used, where the ACK/NACK signal is transmitted being modulated by using the resources allocated to the SR.

All the PUCCH formats employ cyclic shift (CS) of a sequence for each OFDM symbol. The cyclic-shifted sequence is generated by applying a cyclic shift to a base sequence by the particular amount of cyclic shift. The particular amount of CS is specified by a CS index.

The following equation shows one example defining a base sequence $r_u(n)$.

$$r_u(n) = e^{jb(n)\pi/4}, \quad \text{[Equation 1]}$$

where u is a root index; n is a component index such that $0 \leq n \leq N-1$ and N represents length of a base sequence. b(n) is defined in the section 5.5 of the 3GPP TS 36.211 V8.7.0.

The sequence length is the same as the number of elements included in the sequence. u may be determined by a cell ID, a slot number within a radio frame, and so on In case the base sequence is mapped to one resource block in the frequency domain, since one resource block includes 12 subcarriers, the length of the base sequence N becomes 12. Another base sequence is defined according to a different base index.

By applying cyclic shift to the base sequence r(n), a cyclic shifted sequence $r(n, I_{cs})$ can be generated as show in Equation 2.

$$r(n, I_{cs}) = r(n) \cdot \exp\left(\frac{j2\pi I_{cs} n}{N}\right), \quad 0 \leq I_{cs} \leq N-1 \quad \text{[Equation 2]}$$

where $I_{cs}$ is a cyclic shift index indicating the amount of CS ($0 \leq I_{cs} \leq N-1$).

The cyclic shift index available of a base sequence denotes a cyclic shift index which can be derived from the base sequence at CS intervals. For example, if the length of the base sequence is 12 and the CS interval is 1, the total number of cyclic shift index available from the base sequence becomes 12. In another case, if the length of the base sequence is 12 and the CS interval is 2, the total number of cyclic shift index available from the base sequence becomes 6.

Now, described will be transmission of HARQ ACK/NACK signal according to the PUCCH format 1a/1b.

Figure 5:
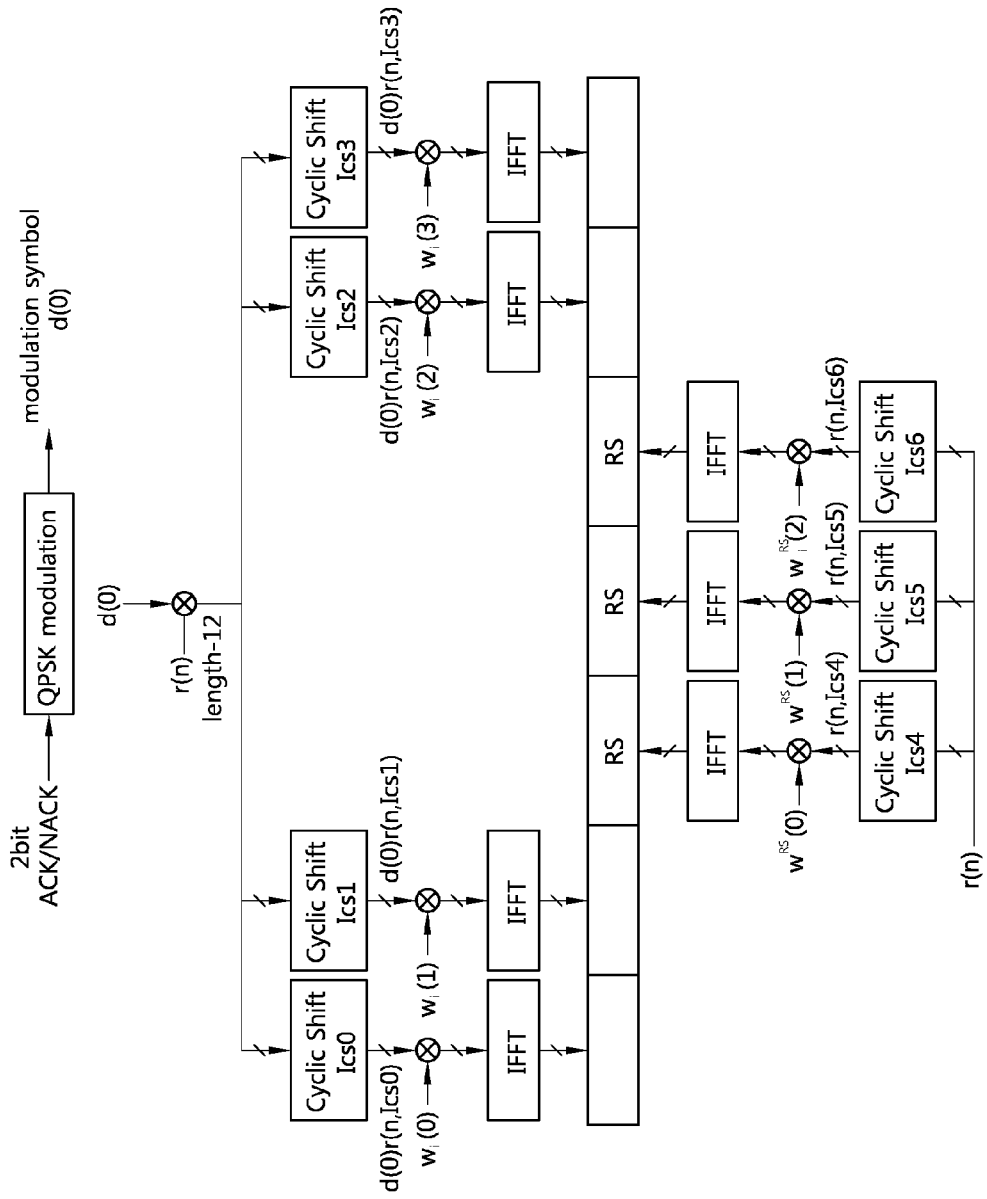
FIG. 5 illustrates the PUCCH format 1b for a normal CP in the 3GPP LTE.

FIG. 5 illustrates the PUCCH format 1b for a normal CP in the 3GPP LTE.

A single slot consists of seven OFDM symbols and three OFDM symbols are assigned as an RS OFDM symbol for a reference signal and four OFDM symbols are assigned as a data OFDM symbol for ACK/NACK signal.

In the PUCCH format 1b, QPSK (Quadrature Phase Shift Keying) modulation is applied to an encoded two-bit ACK/NACK signal, thus generating a modulation symbol d(0).

The cyclic shift index $I_{cs}$ can vary according to the slot number ($n_s$) within a radio frame and/or the symbol index (I) within the slot.

Now that a single slot consists four data OFDM symbols for transmission of ACK/NACK signal in the normal CP, it is assumed that the cyclic shift indices corresponding to the respective data OFDM symbols are $I_{cs0}$, $I_{cs1}$, $I_{cs2}$, $I_{cs3}$.

The modulation symbol d(0) is spread to a cyclic-shifted sequence $r(n, I_{cs})$. If a one-dimensional spread sequence corresponding to the (i+1)-th OFDM symbol in the slot is denoted by m(i), the following relationship can be obtained:

$$\{m(0), m(1), m(2), m(3)\} = \{d(0)r(n, I_{cs0}), d(0)r(n, I_{cs1}), d(0)r(n, I_{cs2}), d(0)r(n, I_{cs3})\}.$$

To increase the capacity of a user equipment, the one-dimensional spread sequence can be spread by using an orthogonal sequence. An orthogonal sequence $w_i(k)$ (i is a sequence index, where $0 \leq k \leq K-1$) with a spreading factor K=4 uses a sequence as follows.

TABLE 2

| Index (i) | [$w_i(0), w_i(1), w_i(2), w_i(3)$] |
|---|---|
| 0 | [+1, +1, +1, +1] |
| 1 | [+1, −1, +1, −1] |
| 2 | [+1, −1, −1, +1] |

An orthogonal sequence $w_i(k)$ (i is a sequence index, where $0 \leq k \leq K-1$) with a spreading factor K=3 uses a sequence as follows.

TABLE 3

| Index (i) | [$w_i(0), w_i(1), w_i(2)$] |
|---|---|
| 0 | [+1, +1, +1] |
| 1 | [+1, $e^{j2\pi/3}$, $e^{j4\pi/3}$] |
| 2 | [+1, $e^{j4\pi/3}$, $e^{j2\pi/3}$] |

Different spreading factors may be used for individual slots.

Therefore, given an arbitrary orthogonal sequence index i, a two-dimensional spread sequence $\{s(0), s(1), s(2), s(3)\}$ can be represented as follows:

$$\{s(0), s(1), s(2), s(3)\} = \{w_i(0)m(0), w_i(1)m(1), w_i(2)m(2), w_i(3)m(3)\}.$$

Two-dimensional spread sequences $\{s(0), s(1), s(2), s(3)\}$ are transmitted from the corresponding OFDM symbols after IFFT is performed. In this way, the ACK/NACK signal is transmitted on the PUCCH.

The reference signal of the PUCCH format 1b, too, is transmitted after a base sequence r(n) is cyclic-shifted and spread by using an orthogonal sequence. Suppose cyclic shift indices corresponding to three RS OFDM symbols are $I_{cs4}$, $I_{cs5}$, $I_{cs6}$, three cyclic-shifted sequences $r(n, I_{cs4})$, $r(n, I_{cs5})$, $r(n, I_{cs6})$ can be obtained. The three cyclic-shifted sequences are spread to an orthogonal sequence $w^{Rs}_i(k)$ with K=3.

The orthogonal sequence index i, a cyclic shift index $I_{cs}$, and a resource block index m are parameters needed to configure the PUCCH and at the same time, resources used for identifying the PUCCH (or user equipment). If the number of cyclic shifts available is 12 and the number of orthogonal sequence indices available is 3, PUCCHs for a total of 36 UEs can be multiplexed with a single resource block.

The 3GPP LTE defines a resource index $n^{(1)}_{PUCCH}$ for obtaining the three parameters for a UE to configure the PUCCH. The resource index is defined as $n^{(1)}_{PUCCH} = n_{CCE} + N^{(1)}_{PUCCH}$. $n_{CCE}$ is the number for a first CCE used for transmission of the corresponding DCI (namely, downlink resource allocation used for receiving downlink data corresponding to ACK/NACK signal) and $N^{(1)}_{PUUCH}$ is a parameter that is informed to a UE by the base station in the form of a higher layer message.

Time, frequency, and code resources used for transmission of ACK/NACK signal are called ACK/NACK resources or PUCCH resources. As described above, index of ACK/NACK resources needed to transmit the ACK/NACK signal on the PUCCH (it is alternatively called ACK/NACK resource index or PUCCH index) can be expressed by at least one of the orthogonal sequence index i, the cyclic shift index $I_{cs}$, the resource block index m, and an index for obtaining the three indices. The ACK/NACK resources can include at least one of the orthogonal sequence, cyclic shift, resource block, and a combination thereof.

Figure 6:
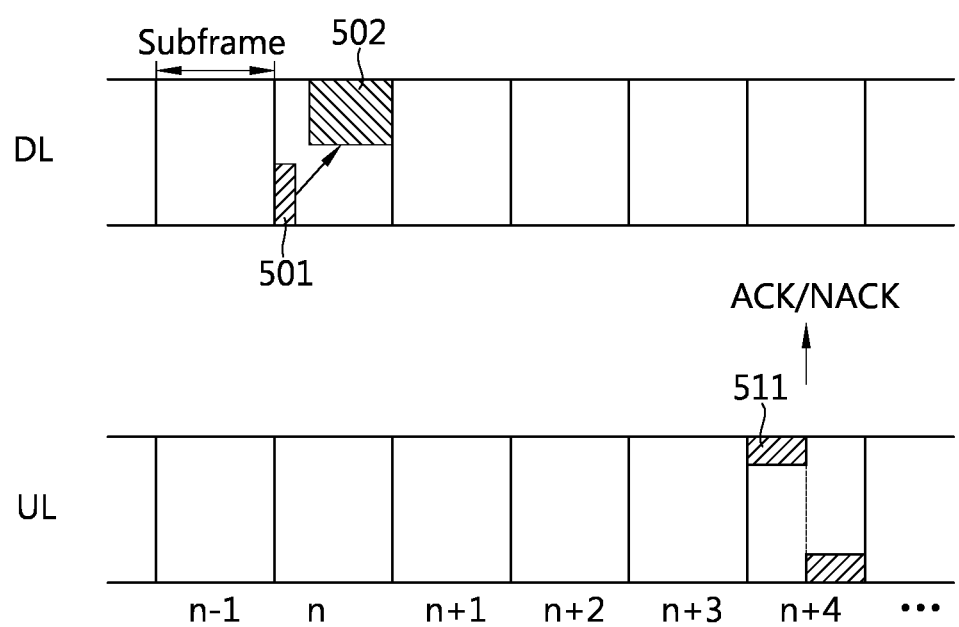
FIG. 6 illustrates one example of carrying out HARQ (Hybrid Automatic Repeat Request)

FIG. 6 illustrates one example of carrying out HARQ (Hybrid Automatic Repeat Request).

A user equipment monitors the PDCCH and receives DL resource allocation information (or DL grant) on the PDCCH 501 in a n-th DL subframe. The UE receives a DL transport block through the PDSCH 502 indicated by the DL resource allocation information.

The UE transmits ACK/NACK signal about the DL transmit block on the PUCCH 511 in a (n+4)-th UL subframe. The ACK/NACK signal may be regarded as reception acknowledgement about the DL transmit block.

The ACK/NACK signal, if the DL transmit block is decoded successfully, works as ACK signal, whereas it becomes NACK signal otherwise. The base station, upon receiving the NACK signal, can perform re-transmission of the DL transmit block until the ACK signal is received or a maximum number of re-transmissions is reached.

The 3GPP LTE specifies that the UE uses resource allocation of the PDCCH 501 in order to configure the resource index for the PUCCH 511. In other words, the lowest CCE index (or the first CCE index) used for the transmission of the PDCCH 501 is chosen for $n_{CCE}$ and the resource index is determined by employing the relationship as follows: $n^{(1)}_{PUUCH}=n_{CCE}+N^{(1)}_{PUUCH}$. As in the above, the PUCCH resources can be determined in an implicit manner.

From now on, described will be a multiple carrier system.

The 3GPP LTE system supports the case where the DL bandwidth is configured differently from the UL bandwidth under the assumption that a single component carrier (CC) is employed. The 3GPP LTE system supports bandwidth of up to 20 MHz and the UL and the DL bandwidth may differ from each other; however, in this case, only one carrier is supported for the UL and the DL.

Carrier aggregation (also referred to as spectrum aggregation or bandwidth aggregation) is for supporting a plurality of carriers. For example, if five CCs are assigned with a granularity in units of carrier having bandwidth of 20 MHz, up to 100 MHz can be supported.

System bandwidth of a wireless communication system is identified by a plurality of carrier frequencies. Here, the carrier frequency denotes the center frequency of a cell. In what follows, a cell may correspond to a pair of a downlink component carrier and a uplink component carrier. Or a cell may refer to a combination of the downlink component carrier and an optional uplink component carrier.

To perform transmission and reception of a transmit block through a particular cell, a user equipment has to first complete configuration of the particular cell. At this point, the configuration corresponds to the state where reception of system information needed for data transmission and reception about the corresponding cell has been completed. For example, the configuration can include the whole procedure of receiving common physical layer parameters needed for data transmission and reception, MAC layer parameters, or parameters needed for particular operation in the RRC layer.

Cells in the configuration completion state may exist either in activation or deactivation state. Here, activation corresponds to data transmission or reception being carried out or in a ready state. The UE, to check resources allocated to itself (which may corresponds to frequency or time resources), can monitor or receive the PDCCH and PDSCH of a cell activated.

In the deactivation state, the UE cannot transmit or receive data but can carry out measurement or transmission/reception of minimal information. The UE can receive system information (SI) needed for carrying out packet reception from a deactivated cell. Meanwhile, the UE does not monitor or receive the PDCCH and PDSCH of a deactivated cell to check resources allocated to itself (which may corresponds to frequency or time resources).

Cells can be divided into primary cells, secondary cells, and serving cells.

The primary cells denotes those cells operating in the primary frequency region, more particularly, the cells carrying out an initial connection establishment procedure between the UE and the base station, the cells carrying out a connection re-establishment procedure, or the cells specified as primary cell in a handover procedure.

The secondary cells denote those cells operating in the secondary frequency region, which are configured once RRC connection is established and are used for providing additional radio resources.

The serving cells consist of primary cells in case carrier aggregation is not configured or the UE is incapable of providing carrier aggregation. In case carrier aggregation is configured, the term of serving cell is used to represent a primary cell and a set consisting of one or more cells among all the secondary cells.

A set of serving cells configured for a single UE may consist only of a single primary cell, or one primary cell and at least one secondary cell.

PCC (Primary Component Carrier) denotes a CC corresponding to the primary cell. The PCC is one of the CCs, with which the UE establishes connection (or RRC connection) with the base station in the initial stage of connection establishment. PCC is responsible for establishing connection (or RRC connection) for signaling of a plurality of CCs and managing UE context information which is the connection information related to the UE. Also, the PCC, being connected to the UE, always remains in the activation state in case of RRC connected mode. The DL component carrier corresponding to the primary cell is called a downlink primary component carrier (DL PCC) while the UL component carrier corresponding to the primary cell is called a uplink primary component carrier (UL PCC).

SCC (Secondary Component Carrier) denotes a CC corresponding to the secondary cell. In other words, the SCC is a CC allocated to the UE in addition to the PCC, which may be regarded as an extended carrier intended for additional resource allocation in addition to the PCC; the state of SCC may be divided into activation or deactivation. The DL component carrier corresponding to the secondary cell is called a downlink secondary component carrier (DL SCC) while the UL component carrier corresponding to the secondary cell is called a uplink secondary component carrier (UL SCC).

The primary and the secondary cell can be characterized as follow.

First, the primary cell is used for transmission of PUCCH. Second, while the primary cell is always in the activated mode, the secondary cell is such a carrier activated or deactivated according to particular conditions. Third, in case the primary cell experiences radio link failure (hereinafter, it is called RLF), RRC re-connection is triggered; however, in case the secondary cell experiences RLF, RRC re-connection is not triggered. Fourth, the primary cell can be changed by a handover procedure accompanying a security key change or a RACH (Random Access Channel) random procedure. Fifth, NAS (Non-Access Stratum) information is received through the primary cell. Sixth, the DL PCC and the UL PCC always form a pair. Seventh, for each UE, a different CC can be configured to be the primary cell. Eighth, a procedure of reconfiguration, addition, and removal of the primary cell can be carried out by the RRC layer. In adding a new secondary cell, RRC signaling may be employed for transmission of system information of a dedicated secondary cell.

For the case of component carriers constituting a serving cell, the DL CC may constitute a single serving cell or a single serving cell may consist of DL CCs and UL CCs being configured to be connected to each other. However, a serving cell is not established with only one UL CC.

Activation or deactivation of a component carrier is equivalent to the concept of activation or deactivation of a serving cell. For example, suppose a serving cell 1 consists of DL CC1. Then, activation of the serving cell 1 indicates activation of the DL CC1. If it is assumed that a serving cell 2 consists of DL CC2 and UL CC2 being configured to be connected to each other, activation of the serving cell 2 indicates activation of the DL CC2 and the UL CC2. In this reason, each component carrier may correspond to a cell.

Figure 7:
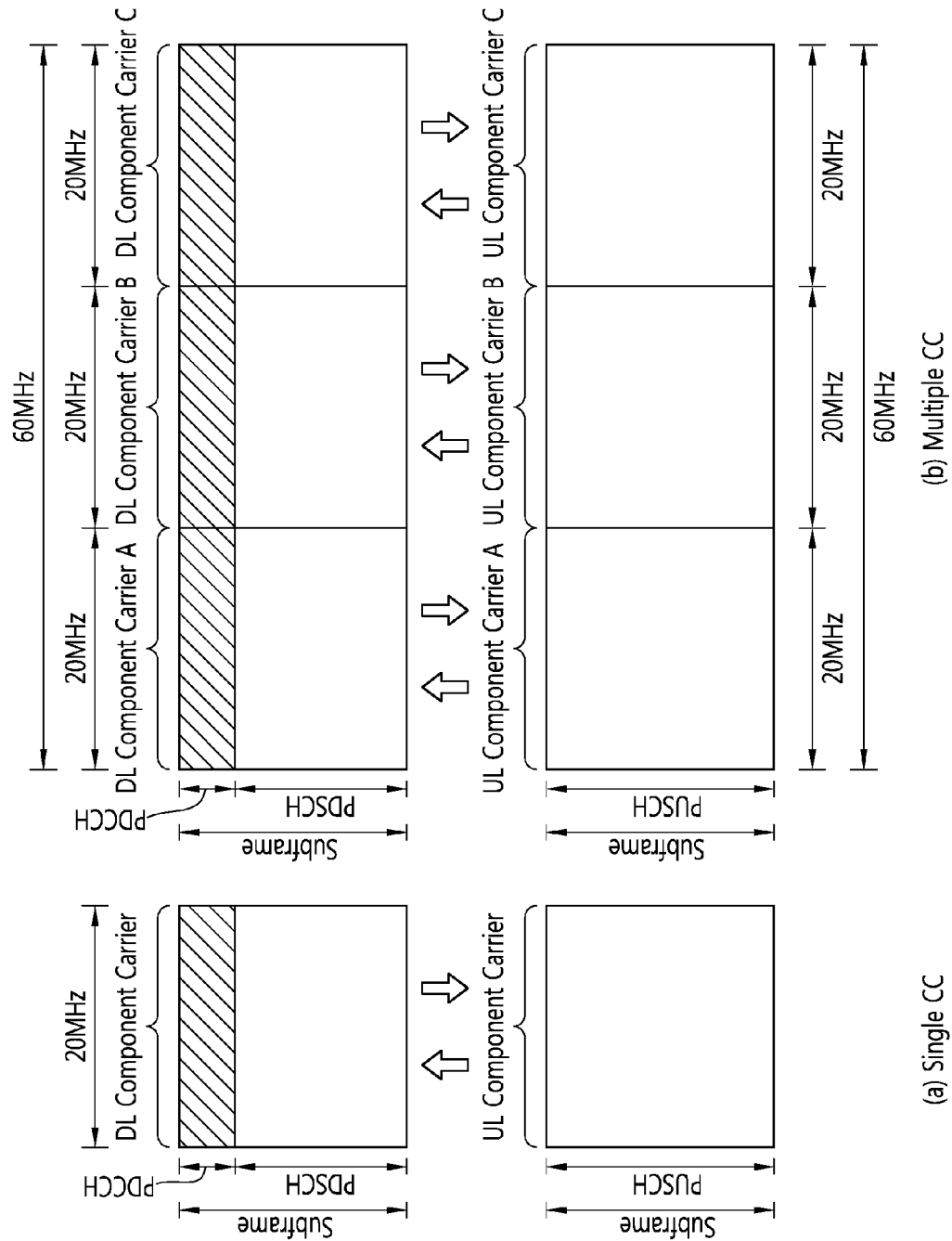
FIG. 7 is one example illustrating a single carrier system and a multiple carrier system.

FIG. 7 is one example illustrating a single carrier system and a multiple carrier system.

A single carrier system such as shown in FIG. 7(a) supports only a single carrier for the UE in the uplink and the downlink. Bandwidth of a carrier may vary but only one carrier is allocated to the UE. Meanwhile, in a multiple carrier system such as shown in FIG. 7(b), a plurality of component carriers (DL CC A to C, UL CC A to C) may be allocated to the UE. For example, three component carriers of 20 MHz bandwidth may be allocated to the UE to assign bandwidth of 60 MHz. Although the example of FIG. 7(b) assumes three DL CCs and UL CCs respectively, the number of DL CCs and UL CCs is not limited to the above assumption. At each DL CC, the PDCCH and the PDSCH are transmitted independently of each other and each UL CC transmits the PUCCH and PUSCH independently of each other. As three pairs of DL CCs and UL CCs are defined, the UE can be regarded to receive a service from three serving cells.

The UE can monitor the PDCCH through a plurality of DL CCs and at the same time, receive a DL transmit block through a plurality of DL CCs. The UE can transmit a plurality of UL transmit blocks simultaneously through a plurality of UL CCs.

In a multiple carrier system, CC scheduling includes two kinds of methods.

In the first method, a PDCCH-PDSCH pair is transmitted in one CC. This CC is called a self-scheduling CC. Furthermore, it means that a UL CC on which a PUSCH is transmitted becomes a CC linked to a DL CC on which a relevant PDCCH is transmitted. That is, PDSCH resources are assigned to the PDCCH on the same CC or PUSCH resources are assigned to the PDCCH on a linked UL CC.

In the second method, a DL CC on which a PDSCH is transmitted or a UL CC on which a PUSCH is transmitted is determined irrespective of a DL CC on which a PDCCH is transmitted. That is, a PDCCH and a PDSCH are transmitted on different DL CCs, or the PUSCH is transmitted on a UL CC not linked to a DL CC on which a PDCCH has been transmitted. This is called cross-carrier scheduling. The CC on which the PDCCH is transmitted is called a PDCCH carrier, a monitoring carrier, or a scheduling carrier, and the CCs on which the PDSCH/PUSCH is transmitted are called PDSCH/PUSCH carriers or scheduled carriers.

As shown in FIG. 7(b), three DL CC are configured for a single UE and the PDSCH of a single DL CC transmits a maximum of two transmit blocks through spatial multiplexing, the UE can receive up to six transmit blocks from a single subframe. At this time, the UE has to provide ACK/NACK having six bits of information as feedback information. However, since the PUCCH structure defined in the 3GPP LTE system is designed basically based on two bits of ACK/NACK signal, there is needed to design a control channel capable of carrying ACK/NACK signal with the amount of information increased.

To this purpose, the LTE-A system proposes a method for transmitting a plurality of ACK/NACK information by employing channel coding as in the PUCCH format transmitting CQI, a method for defining a new PUCCH format with which a plurality of ACK/NACK can be transmitted, and a method for transmitting a plurality of ACK/NACK information by using a plurality of PUCCH resources. However, if the UL channel environment is unfavorable, it might be the case that transmission of a plurality of ACK/NACK information becomes difficult due to the limitations to transmission power of the UE.

By taking the above situation into account, a method for transmitting a plurality of ACK/NACK information about a plurality of PDSCH (or a plurality of transmit blocks) through bundling has been proposed. ACK/NACK bundling is combining ACK/NACK bits about the PDSCH of a plurality of DL CCs through logical AND operation. For example, in case the UE successfully receives or decodes a plurality of PDSCHs through a plurality of DL CCs, only one ACK bit is transmitted. Meanwhile, if any one of PDSCHs fails in receiving or decoding at the time of receiving a plurality of PDSCHs through a plurality of DL CCs, the UE may transmit the NACK bit or nothing else.

The ACK/NACK bundling requires information about the number of PDSCHs received simultaneously by the UE at one subframe. The UE compares the number of PDSCHs scheduled simultaneously at one subframe and the number of PDSCHs actually received and determines whether there are PDSCHs that the UE has failed to receive.

For example, the LTE TDD system provides a field called downlink assignment index (DAI) in the DCI transmitted through the PDCCH, which informs of the number of PDSCHs scheduled in the time domain through the DAI. Meanwhile, the DCI used in the LTE FDD system does not provide the DAI field.

However, since the FDD system in the LTE-A specifications can receive a plurality of PDSCHs through a plurality of DL CCs at one subframe, a method may be taken into account, which informs of the number of PDSCHs scheduled simultaneously in the frequency domain for one subframe by adding a field such as the DAI of the LTE TDD system to the DCI. However, adding the DAI field to the DCI of PDCCH has a disadvantage of increasing overhead of the PDCCH.

In what follows, described will be a method for the UE's transmitting ACK/NACK in a multiple carrier system according to the present invention.

Figure 8:
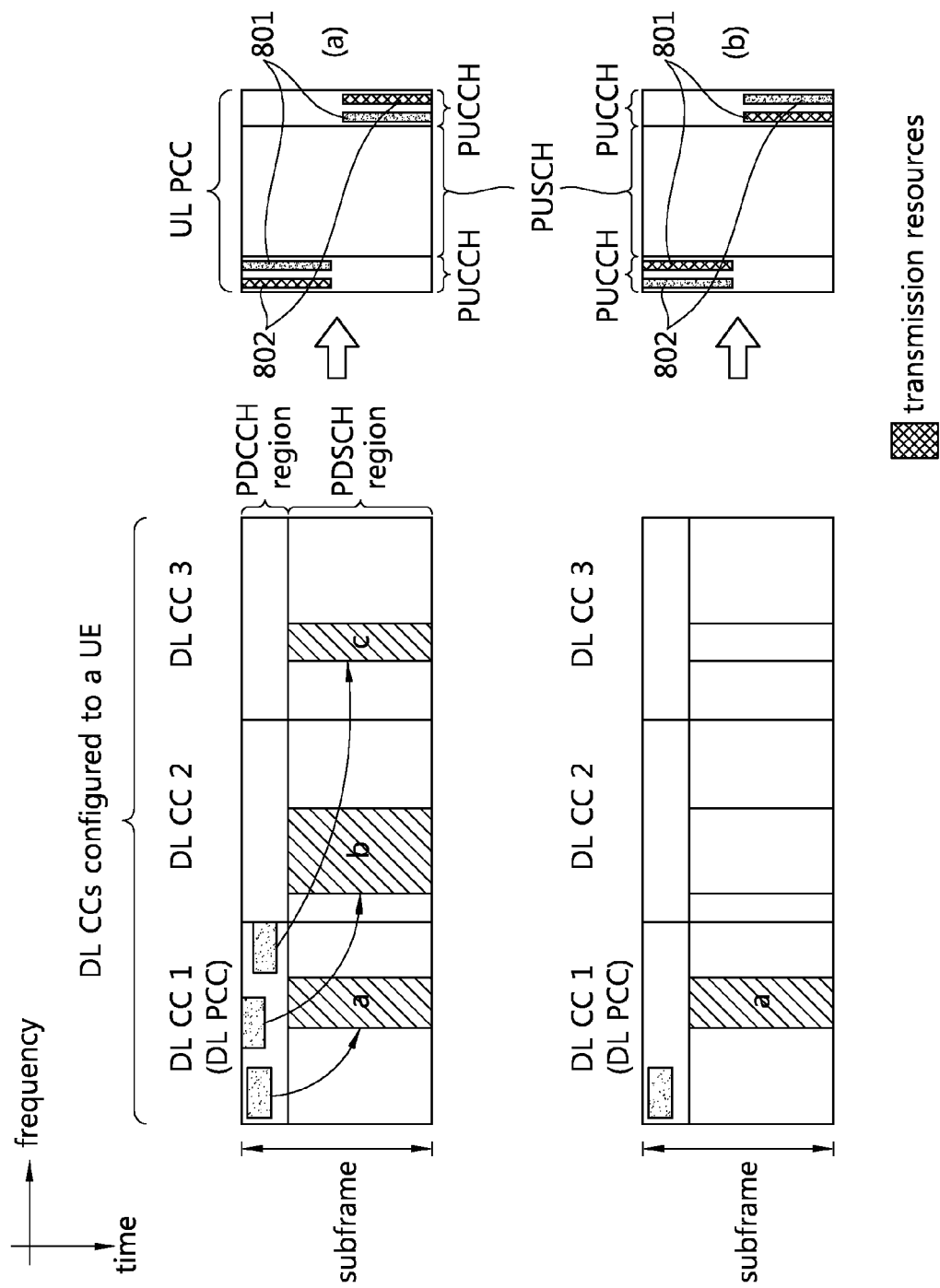
FIG. 8 illustrates a method for transmitting ACK/NACK in a multiple carrier system operating in FDD scheme.

FIG. 8 illustrates a method for transmitting ACK/NACK in a multiple carrier system operating in FDD scheme.

Referring to FIG. 8, DL CC1, DL CC2, and DL CC3 are assigned to the UE. DL CC1 may correspond to DL PCC. The PDCCH scheduling the DL CC1 does not include information about the total number of PDSCHs on a plurality of LD CCs scheduled simultaneously at the corresponding subframe. That is, the PDCCH does not include the DAI field in the same way as the DCI format of the FDD system of the existing LTE specifications. Meanwhile, the PDCCH which schedules DL CC2 or DL CC3 rather than the DL PCC includes the information about the total number of PDSCHs on the plurality of DL CCs scheduled simultaneously at the corresponding subframe. In other words, the PDCCH which schedules a particular DL CC such as DL PCC does not include information about the total number of PDSCHs; however, the PDCCH scheduling the other remaining DL CCs includes the information about the total number of PDSCHs.

To this purpose, the DCI format transmitted through the PDCCH scheduling the DL CC2 or DL CC3 may change the purpose of a particular field into the one different from the original use. The LTE-A specifies that the PUCCH can be transmitted only through one UL CC, for example, UL PCC. And the DCI scheduling the PUCCH of the UL PCC is transmitted through the PDCCH of the DL PCC. Therefore, a TPC (Transmission Power Control) field for controlling PUCCH transmission power is mandatory for the PDCCH scheduling the UL PCC, whereas the PDCCH which does not schedule the UL PCC does not require the TPC field for controlling the PUCCH transmission power. Therefore, it is possible to change the unnecessary TPC field to be used as the DAI field.

In other words, in the above example, it can be said that the PDCCH scheduling the DL CC1 does not include the DAI field, whereas the PDCCH scheduling the DL CC2 or DL CC3 which changes the TPC field for controlling PUCCH transmission power may be regarded to include the DAI field. At this point, the TPC field for controlling the PUCCH transmission power is only one example and the present invention is not limited thereto. In other words, a particular field unnecessary or reserved may not be employed for the original use of the field but may be used for notifying of the number of PDSCHs.

In case the UE receives a PDCCH scheduling DL CC2 or DL CC3, the total number of PDSCHs scheduled at the corresponding subframe can be known through the TPC field. However, there may be the case where although the base station transmits three PDCCHs as shown in FIG. 8(a), the UE fails to receive the PDCCH scheduling the DL CC2 or DL CC3 but receives only the PDCCH scheduling the DL CC1 as shown in FIG. 8(b). In that case, the UE is unable to know the number of PDSCHs scheduled simultaneously at the corresponding subframe but supposes that only one PDSCH has been scheduled. If ACK/NACK bundling had been configured through RRC signaling, the UE would transmit ACK, which makes the base station wrongly interpret that the UE has succeeded to receive all the three PDSCHs. To solve the problem above, the present invention allows making separate use of the resources transmitting ACK/NACK bundles and the PUCCH resources transmitting ACK/NACK in response to the PDSCH received at a single DL CC.

In other words, in case the UE receives a plurality of PDSCHs by receiving a plurality of PDCCHs through three DL CCs from a single subframe as shown in FIG. 8(a), ACK/NACK bundled through second resources 802 is transmitted. At this time, the UE figures out the total number of PDSCHs, for example, through the TPC field included in the PDCCH scheduling the DL CC2 and transmits bundled ACK or NACK by comparing the total number of PDSCHs with the number of PDSCHs successfully received. The second resources 802 through which bundled ACK/NACK is transmitted may correspond to the resources explicitly specified (or reserved) through RRC or PDCCH. The second resources 802 may be configured for each UE or each group of UEs.

On the other hand, in case the UE receives a single PDSCH through a particular DL CC (the DL CC scheduled by a PDCCH incapable of informing of the total number of PDSCHs, for example, DL PCC) from a single subframe, too, ACK/NACK is transmitted through first resources 801 as shown in FIG. 8(b). At this time, the first resources 801 can be determined implicitly based on the resources (CCE) of the PDCCH which schedules the DL PCC as described above with reference to FIG. 5.

The UE transmits ACK/NACK by using the PUCCH resources, the whole or part of which is configured exclusively according to the number of PDSCHs received at the same subframe. The base station can easily recognize whether ACK/NACK is related to a plurality of PDSCHs based on through which PUCCH resources the ACK/NACK has been transmitted and thus, can reduce the possibility of error occurrence.

Figure 9:
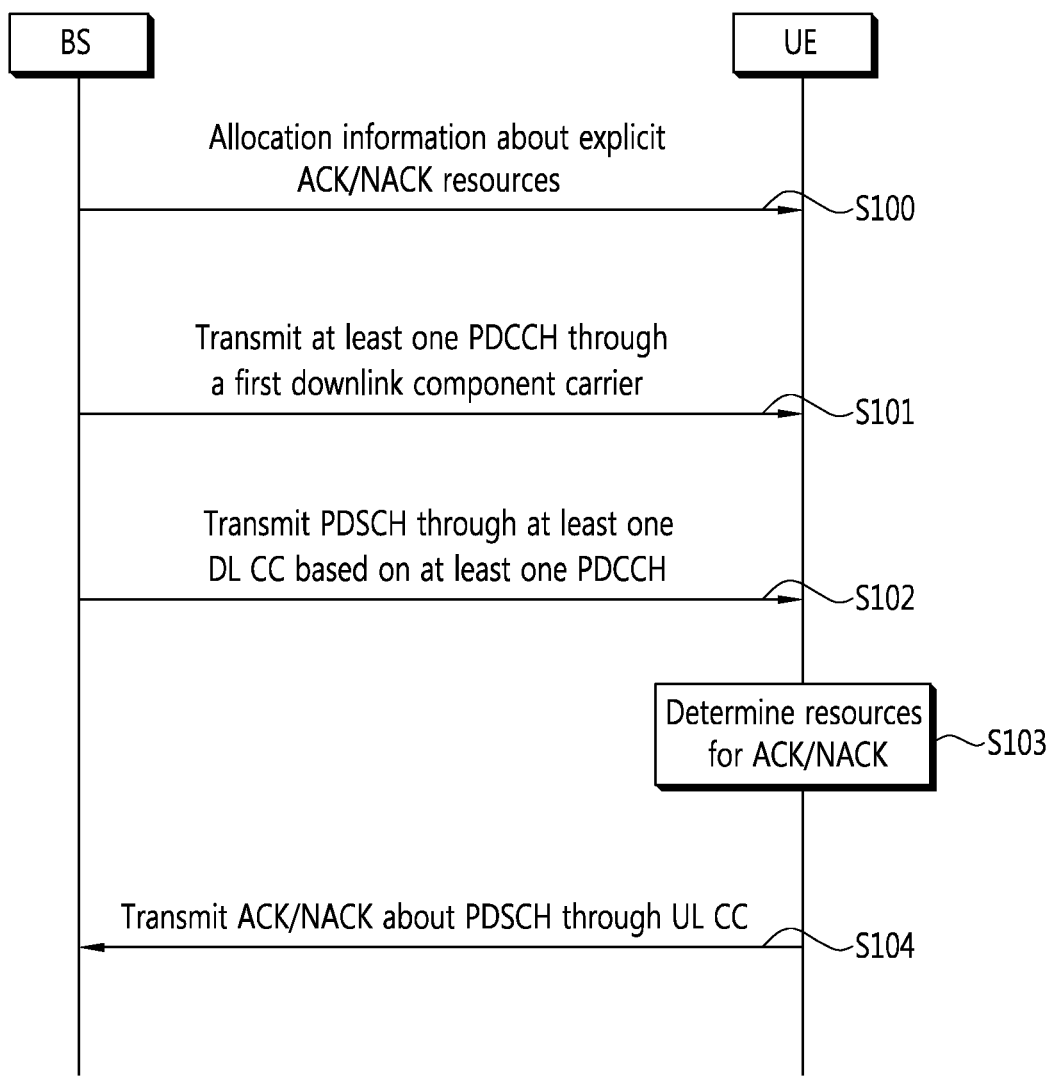
FIG. 9 is a flow diagram illustrating a method for transmitting ACK/NACK in a multiple carrier system operating in FDD scheme.

FIG. 9 is a flow diagram illustrating a method for transmitting ACK/NACK in a multiple carrier system operating in FDD scheme.

With reference to FIG. 9, the base station provides the UE with allocation information about explicit ACK/NACK resources through a higher layer signal such as RRC S100.

The base station transmits at least one PDCCH through a first downlink component carrier (for example, through DL PCC) at a first subframe and the UE receives the PDCCH S101.

The base station transmits the PDSCH scheduled by the at least one PDCCH at the first subframe through at least one DL CC and the UE receives the PDSCH S102.

The UE determines resources for ACK/NACK S103 and transmits the ACK/NACK through a UL CC S104. The procedure for the UE to determine resources for ACK/NACK can be found in the description provided above with reference to FIG. 8.

The method above describes transmission of bundled ACK/NACK by explicitly configured PUCCH resource, for example, the second resources 802, but is not limited to the above description. In other words, various other examples are also allowed. For example, it is possible to transmit information about the number of PDSCHs received successfully at the second resources 802, which is called ACK counting. That is, in case the UE receives a plurality of PDSCHs through a plurality of DL CCs at a single subframe, the UE transmits the number of ACKs through the second resources 802 specified explicitly, while in case only one PDSCH is received through a single DL CC, the UE transmits ACK/NACK through the first resources 801 determined implicitly.

For example, when a QPSK-modulated modulation symbol is transmitted at the second resources, two bits of information are transmitted. At this time, the number of PDSCHs successfully received by the UE from the corresponding subframe can be represented according to the position on the contellation of the modulation symbol.

Figure 10:
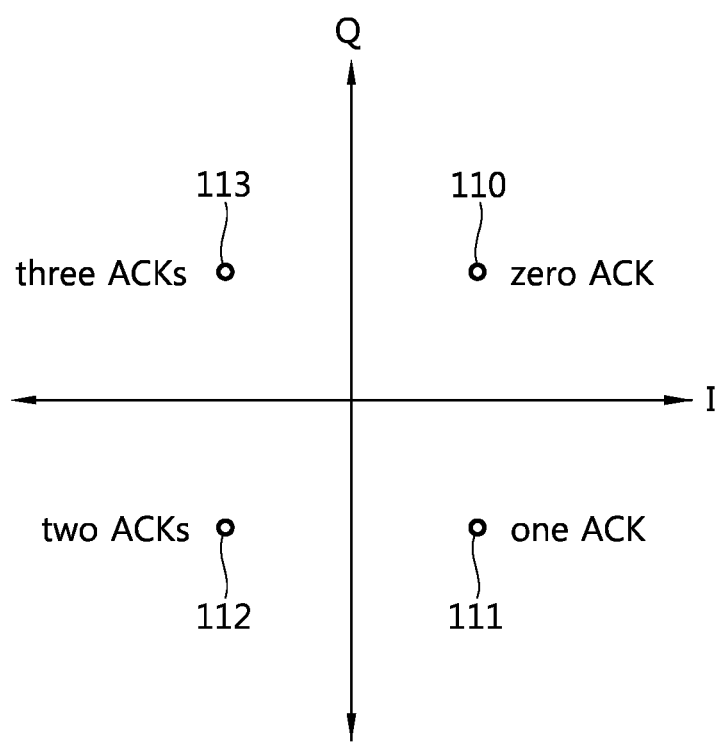
FIG. 10 is one example illustrating the number of ACKs determined according to the position on the constellation of a modulation symbol

FIG. 10 is one example illustrating the number of ACKs determined according to the position on the constellation of a modulation symbol.

With reference to FIG. 10, the number of ACKs may range from 0 to 3 according to the position on the signal quadrant of a modulation symbol. The position on the signal quadrant can be represented by two bits of information such as 00, 01, 10, and 11. The number of ACKs does not necessarily have to be matched one-to-one to the position on the signal quadrant.

For example, the number of ACKs can correspond to the bit value according to the position on the signal quadrant as shown in the table below.

TABLE 4

| ACK counter | HARQ-ACK states |
|---|---|
| 0 | 00 |
| 1 | 10 |
| 2 | 01 |
| 3 | 11 |
| 4 | 10 |
| 5 | 01 |
| 6 | 11 |
| 7 | 10 |
| 8 | 01 |
| 9 | 11 |

As shown in the Table 4, for example, if the two bits are 10, the number of ACKs indicated by an ACK counter can correspond to 1, 4, or 7. Since the base station is aware of the number of PDCCHs (DL grants) allocated to the UE, the number of ACKs can be predicted. For example, suppose the base station assigns three DL CCs to the UE and each DL CC operates in the SU-MIMO mode. At this time, if the UE provides 10 as feedback, the base station predicts the number of ACKs as 1 or 4 depending on channel conditions. While a total of six codewords are transmitted through three DL CCs, it is possible to provide seven ACKs as feedback but the number of ACKs can be estimated according to channel conditions. Although the example above describes the case where the ACK counter indicates the number of ACKs, the present invention is not limited to the above example. In other words, the ACK counter can represent the number of NACKs.

Figure 11:
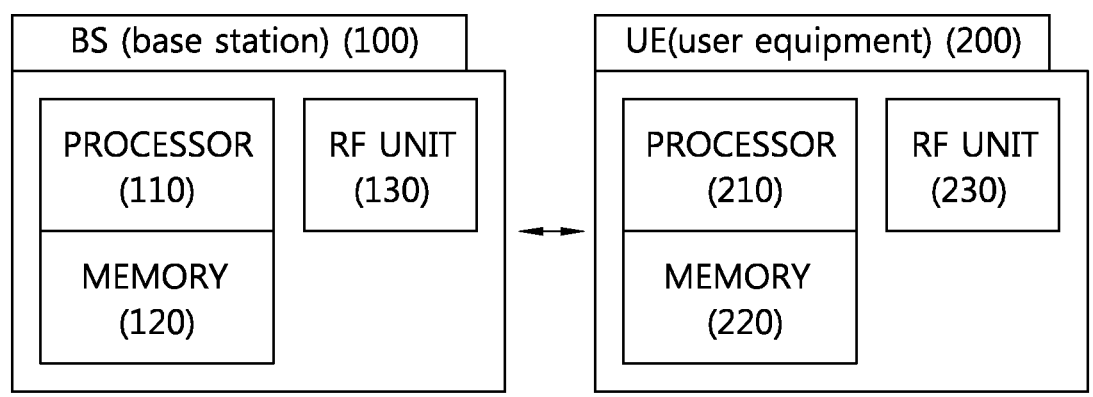
FIG. 11 is a block diagram illustrating a base station and a user equipment in which an embodiment of the present invention is implemented.

FIG. 11 is a block diagram illustrating a base station and a user equipment in which an embodiment of the present invention is implemented.

A base station 100 comprises a processor 110, a memory 120, and an RF (Radio Frequency) unit 130. The processor 110 implements proposed functions, procedures, and/or methods. Layers of radio interface protocol can be implemented by the processor 110. The processor 110 allocates explicit resources to a user equipment, with which the UE can transmit bundled ACK/NACK or the number of ACKs through a higher layer signal such as RRC. The memory 120, being connected to the processor 110, stores various pieces of information needed for operating the processor 110. The RF unit 130, being connected to the processor 110, transmits and/or receives radio signals.

A user equipment 200 comprises a processor 210, a memory 220, and an RF unit 230. The processor 210 implements proposed functions, procedures, and/or methods. Layers of radio interface protocol can be implemented by the processor 210. The processor 210 receives at least one PDCCH through a particular downlink component carrier among a plurality of downlink component carriers from a first subframe and receives PDSCH based on the PDCCH. And, the processor 210 transmits ACK/NACK indicating success or failure of demodulation of the PDSCH through a uplink component carrier from a second subframe; if downlink data are received only through a particular downlink component carrier, ACK/NACK is transmitted by using implicit resources within the second subframe, while if the downlink data are received through two or more downlink component carriers, the ACK/NACK is transmitted through explicit resources within the second subframe. At this time, the implicit resources may be determined based on the resources of a PDCCH scheduling the particular downlink component carrier and the explicit resources may be determined beforehand by a higher layer signal such as RRC. Also, implicit resources and explicit resources can be allocated exclusively to each other. The memory 220, being connected to the processor 210, stores various pieces of information needed for operating the processor 210. The RF unit 230, being connected to the processor 210, transmits and/or receives radio signals; and transmits the spread complex modulation symbols to the base station.

The processor may include Application-Specific Integrated Circuits (ASICs), other chipsets, logic circuits, and/or data processors. The memory 120, 220 may include Read-Only Memory (ROM), Random Access Memory (RAM), flash memory, memory cards, storage media and/or other storage devices. The RF unit 130, 230 may include a baseband circuit for processing a radio signal. When the above-described embodiment is implemented in software, the above-described scheme may be implemented using a module (process or function) which performs the above function. The module may be stored in the memory 120, 220 and executed by the processor 110, 210. The memory 120, 220 may be disposed to the processor 110, 210 internally or externally and connected to the processor 110, 220 using a variety of well-known means. In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

The above-described embodiments include various aspects of examples. Although all possible combinations for describing the various aspects may not be described, those skilled in the art may appreciate that other combinations are possible. Accordingly, the present invention should be construed to include all other replacements, modifications, and changes which fall within the scope of the claims.

The invention claimed is:

1. A method for transmitting uplink control information of a user equipment (UE) for which a plurality of serving cells are configured in a wireless communication system, the method comprising:

receiving downlink control information on at least one physical downlink control channel (PDCCH) in a first subframe through a first serving cell among the plurality of serving cells;

receiving data on at least one physical downlink shared channel (PDSCH) in the first subframe through at least one serving cell among the plurality of serving cells based on the downlink control information; and transmitting acknowledgement/negative acknowledgement (ACK/NACK) indicating success or failure of decoding of the data in a second subframe, wherein the ACK/NACK is transmitted by using first resource within the second subframe when one PDSCH is received only through the first serving cell, wherein the ACK/NACK is transmitted by using a second resource within the second subframe when a plurality of PDSCHs are received through two or more serving cells from among the plurality of serving cells, wherein the first resource is allocated dynamically by a PDCCH which schedules the first serving cell, and the second resource is predetermined, wherein, among the at least one PDCCH, a PDCCH which schedules a serving cell except for the first serving cell includes PDSCH aggregate information indicating a total number of PDSCHs transmitted through the plurality of serving cells in the first subframe, and wherein the PDSCH aggregate information is transmitted through a transmission power control (TPC) field of an uplink component carrier.

2. The method of claim 1, wherein the first serving cell is a primary cell in which the UE carries out a procedure of establishing an initial connection to a base station or a procedure of re-establishing a connection.

3. The method of claim 2, wherein the first serving cell includes a first downlink component carrier and a first uplink component carrier, wherein the at least one PDCCH is received through the first downlink component carrier and the ACK/NACK is transmitted through the first uplink component carrier.

4. The method of claim 3, wherein the first resource is determined based on a resource of a PDCCH which schedules the first downlink component carrier.

5. The method of claim 4, wherein the second resource is indicated by a radio resource control (RRC) message.

6. The method of claim 1, wherein, if a number of PDSCH received successfully through the at least one serving cell is the same as a number of PDSCHs indicated by the PDSCH aggregate information, one ACK is transmitted through the second resource.

7. The method of claim 1, wherein, if a number of PDSCH received successfully through the at least one serving cell is smaller than a number of PDSCHs indicated by the PDSCH aggregate information, one NACK is transmitted through the second resource.

8. The method of claim 1, wherein ACK/NACK transmitted through the second resource represents a number of PDSCHs received successfully through the at least one serving cell or a number of PDSCHs not received successfully.

9. The method of claim 1, wherein the transmitting ACK/NACK comprises:
obtaining the first resource from a PDCCH which schedules a PDSCH received through the first serving cell;
generating a modulation symbol by modulating the ACK/NACK;
determining a cyclic shift value based on the first resource;
generating a cyclic-shifted sequence by applying a cyclic shift to a base sequence by the cyclic shift value;
spreading the modulation symbol to the cyclic-shifted sequence; and
transmitting the spread sequence.

10. The method of claim 1, wherein the plurality of serving cells operate according to a frequency division duplex (FDD) scheme which uses different frequencies in the uplink and downlink.

11. A user equipment, comprising:
a radio frequency (RF) unit transmitting or receiving radio signals; and
a processor connected to the RF unit,
wherein the processor receives downlink control information on at least one physical downlink control channel (PDCCH) in a first subframe through a first serving cell among a plurality of serving cells, receives data on at least one physical downlink shared channel (PDSCH) in the first subframe through at least one serving cell among the plurality of serving cells based on the downlink control information, and transmits acknowledgement/negative acknowledgement (ACK/NACK) indicating success or failure of decoding of the data in a second subframe,
wherein the ACK/NACK is transmitted by using a first resource within the second subframe when one PDSCH is received only through the first serving cell;
wherein the ACK/NACK is transmitted by using a second resource within the second subframe when a plurality of PDSCHs are received through two or more serving cells among the plurality of serving cells,
wherein the first resource is allocated dynamically through a PDCCH which schedules the first serving cell, and the second resource is predetermined,
wherein, among the at least one PDCCH, a PDCCH which schedules a serving cell except for the first serving cell includes PDSCH aggregate information indicating a total number of PDSCHs transmitted through the plurality of serving cells in the first subframe, and
wherein the PDSCH aggregate information is transmitted through a transmission power control (TPC) field of an uplink component carrier.

\* \* \* \* \*